United States Patent [19]

Kamikura et al.

[11] Patent Number: 4,734,631
[45] Date of Patent: Mar. 29, 1988

[54] STEP MOTOR CONTROL

[75] Inventors: Shigeo Kamikura; Yasushi Ema, both of Kadaira, Japan

[73] Assignee: Silver Seiko Ltd., Japan

[21] Appl. No.: 887,956

[22] Filed: Jul. 22, 1986

[30] Foreign Application Priority Data

Jul. 25, 1985 [JP] Japan .................. 60-162810

[51] Int. Cl.[4] ............................. G05B 19/40
[52] U.S. Cl. .................... 318/685; 318/696
[58] Field of Search ................. 318/685, 696

[56] References Cited

U.S. PATENT DOCUMENTS 4,446,413  5/1984  Remus et al. ............... 318/696

OTHER PUBLICATIONS

Proceedings of Eleventh Annual Symposium on Incremental Motion Control, Kuo and Butts, pp. 295–308, May 1982.

Primary Examiner—William M. Shoop, Jr.
Assistant Examiner—Saul M. Bergmann
Attorney, Agent, or Firm—Lorusso & Loud

[57] ABSTRACT

A step motor control system which can control a step motor to rotate at a variable high speed like a brushless motor. A position signal indicating a position of a rotor of a step motor relative to a specific one of field windings is detected as a voltage signal which is successively compared with a reference voltage in order to detect a specific angular position of the rotor at which selective energization and deenergization of the field windings are started for a next stepping operation of the motor.

The position signal may be extracted as a voltage signal from an electric current flowing through a last energized field winding by a resistor connected thereto. From the voltage signal, a back EMF induced in the field winding due to its self inductance is subtracted to detect a voltage position signal or EMF induced in the field winding by a permanent magnet of the rotor. The back EMF is produced by an electronic simulation means including an integrating circuit having a same time constant with the field winding.

20 Claims, 11 Drawing Figures

4,734,631

STEP MOTOR CONTROL

BACKGROUND OF THE INVENTION

This invention relates to a control system for a step motor, and more particularly to a closed-loop control for controlling a step motor in response to rotation of the step motor.

A closed-loop control for a step motor is already known wherein a rotational angular position of a step motor is detected and a field winding of a next phase is energized at an optimum point of time, that is, at an optimum rotational angular position of the step motor to drive the step motor in order to prevent step-out of the step motor. In determining such an optimum point of time, also a rotational speed of the step motor is commonly taken into consideration.

Where a load is relatively heavy or is to be driven at a high speed, the closed-loop control technique is preferably employed. One of application of the closed-loop control is, for example, a daisy wheel typewriter or printer in which a rotary type wheel commonly called a daisy wheel is rotated to position a type of a selected character to a print position to allow printing of the character. In the typewriter or printer of this type, the rotor of the step motor is rotated from one to another rotational angular position in one or the other direction in response to a character selecting instruction. As the time required for rotation from one to another position reduces, apparently the overall printing speed of the typewriter or printer will rise. Accordingly, the closed-loop control is commonly used in high speed typewriters or printers.

A concept of an angle of lead may be involved in order to attain a high speed rotation of a step motor under a closed-loop control. It is known that where the lead angle of a step motor is between 1 step and 2 steps, that is, electrically between 90 and 180 degrees, the step motor will rotate continuously like a brushless motor. In this instance, theoretically an angle of lead of 1.5 steps or electrically 135 degrees will yield a maximum rotational speed whereas the rotational speed will be in the minimum when the lead angle is 1 step or 2 steps, that is, electrically 90 or 180 degrees, and the speed will vary continuously between 1 step and 2 steps, that is, between 90 and 180 degrees.

Conventionally, a rotary encoder such as an optical encoder is used to detect a rotational position and speed of a step motor. Step motor controls including a rotary encoder are normally very expensive compared with controls without a rotary encoder because such a rotary encoder is expensive.

Means is also known which detects an electromotive force (EMF) or back EMF induced in a field winding of a step motor to detect a rotational angular position of the rotor of the motor. This technique is disclosed, for example, in U.S. Pat. Nos. 4,282,471 and 4,480,218. In a step motor control disclosed in U.S. Pat. No. 4,282,471, a back EMF which is induced in a non-excited phase field winding by a mutual inductance with an excited phase field winding is detected to detect a rotational position of the rotor of the motor. On the other hand, in a step motor control disclosed in the former patent, EMF which is induced in a field winding by a permanent magnet of the rotor of a step motor is detected directly by a specifically provided sensing means to detect a rotational position of the rotor.

Feedback signals obtained from a rotary encoder or from back EMF are used in most cases to determine whether or not a step motor is actually at a proper rotational angular position or whether or not a step motor is in a step-out condition so that, when the step motor is in a step-out condition, either a positional error may be compensated for or the motor may be restored to its home position. Otherwise, feedback signals are used to determine when a next phase field winding is to be energized. In the latter case, a timing of next energization may be selectively determined in response to the feedback signal and clock pulse signals of the system. Accordingly, infinite velocity control cannot be attained.

SUMMARY OF THE INVENTION

It is an object of the present invention to provide a step motor control system which can control a step motor to rotate from one to another rotational angular position in a minimized period of time.

It is another object of the invention to provide a step motor control system which can achieve infinite velocity control of rotation of a step motor.

It is a further object of the invention to provide a step motor control system which can achieve effective feedback control of a step motor without using an expensive electric element such as a rotary encoder.

It is a still further object of the invention to provide a novel and efficient step motor control system which can be effectively applied to common step motors.

DISCLOSURE OF THE INVENTION

In order to have the present invention understood well, a description of a simple control for controlling a four phase step motor in the "four phase one on" excitation will be provided. Of course, the invention can be applied to a step motor of different implementation in any different excitation.

Figure 1A:
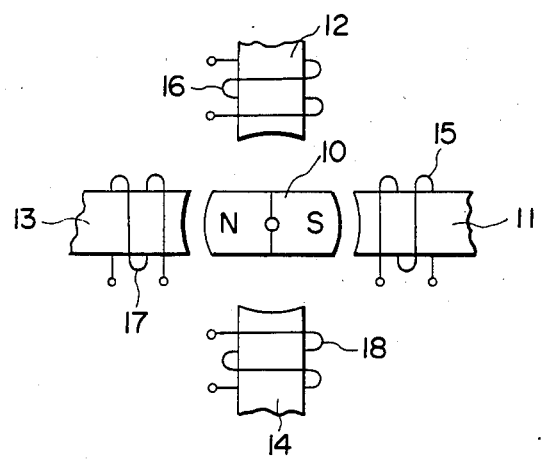
FIG. 1A is a simplified diagrammatic view of a four phase step motor useful in explaining the operation of the invention.

Referring to FIG. 1A, there is shown, in a schematic representation, a four phase permanent magnet step motor. The step motor includes a rotor 10 having a permanent magnet North and South pole, and four stator poles 11, 12, 13 and 14 on which windings 15, 16, 17 and 18 are provided, respectively.

Figure 1B:
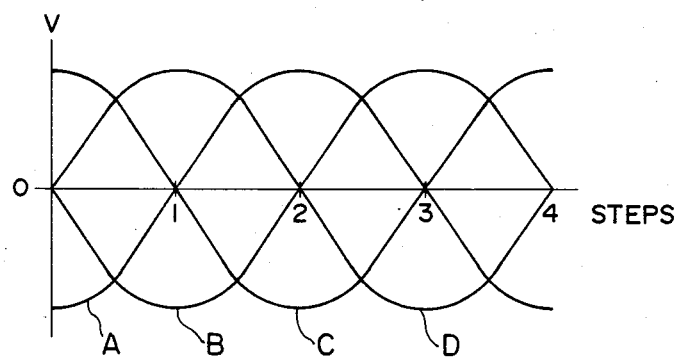
FIG. 1B is a graphic diagram of the EMF waveforms induced in windings of the motor of FIG. 1.

Referring now to FIG. 1B, the EMF waveforms induced in the windings 15, 16, 17 and 18 of the step motor of FIG. 1A when the rotor 10 rotates one full rotation at a presumably constant speed are labeled A, B, C and D, respectively. The four waveforms of FIG. 1B are simple sinusoidal quadrature waveforms and thus need no further explanation, except that each zero crossing demarks a detent or step position.

As is well known in the art, any of the sinusoidal waveforms indicative of the EMFs induced in the field windings successively indicates a current position of the rotor of the step motor independently of energization of the field windings. In other words, when the step motor is rotating at a fixed speed, the EMF induced at any time in any of the field windings depends only upon a current rotational angular position of the rotor whether or not the field winding is energized and no matter when energization or deenergization of the field winding started. Accordingly, where the step motor is rotating at a fixed speed and the magnitude of the EMF is already known, a current rotational position of the step motor, that is, the rotor of the motor, can be determined by measuring the EMF induced in a particular one of the field windings of the motor.

Figure 1C:
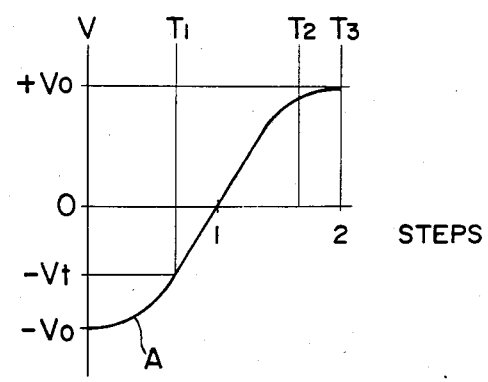
FIG. 1C is a graphic diagram of part of one of the EMF waveforms of FIG. 1B useful in explaining the basic principle of the invention.

FIG. 1C illustrates part of one of the waveforms of FIG. 1B useful in explaining the principle of the present invention. Referring to FIG. 1C, it is assumed, for convenience of description, that the waveform shown is taken in conjunction with the winding 15 of the step motor of FIG. 1A which rotates, in FIG. 1A, at a fixed velocity in a counterclockwise direction from the position shown. Thus, while the rotor 10 rotates two steps, that is, by an angle of 180 degrees in the counterclockwise direction from the position shown in FIG. 1A, the EMF induced in the winding 15 will vary from a negative maximum value −Vo to a positive maximum value +Vo, crossing 0 volt at a position of the rotor 10 after rotation of an angle of 90 degrees, in which position the N pole of the rotor 10 is located adjacent the stator pole 14 for the winding 15 in question.

As can be appreciated from the description of FIG. 1B, the position of the rotor can be determined from the waveform shown. For example, when the EMF is −Vo volt, the rotor 10 is at a position as shown in FIG. 1A, and when the EMF is +Vo volt, the rotor 10 is at a position after the rotor 10 has been rotated two steps T3, that is, 180 degrees in the counterclockwise direction from the original position of FIG. 1A. Meanwhile, when the EMF is, for example, −Vt volt, the rotor 10 is at a position after rotation from the original position by an angle corresponding to a step T1 in FIG. 1C. Accordingly, if a predetermined EMF level, for example, −Vt volt, is detected, apparently it is determined that the rotor is at a corresponding position, for example, at an angular position corresponding to the step T1.

According to the present invention, such an angular position as can be thus represented by the EMF level is used to determine an angle of lead in driving the step motor as described hereinabove. Thus, for example, if a time T1 when the EMF becomes −Vt volt is detected and the field winding 15 of FIG. 1A begins to be energized at the time T1, the step motor is driven at an angle of lead corresponding to T3-T1 (FIG. 1C) steps. In other words, if the step motor is to be driven at an angle of lead corresponding to T3-T1 steps, a time T1 when the EMF becomes −Vt volt will be detected and energization of the field winding 15 will start at the time T1. If the EMF level −VT is changed, the angle of lead will vary accordingly, and hence the rotational speed of the motor will vary accordingly where the motor is rotating continuously like a brushless motor, as described hereinabove.

Thus, according to the invention, an EMF induced in a field winding of a particular phase is detected to detect a time when the EMF becomes equal to a reference voltage, and at the time, a field winding of a phase to be subsequently energized begins to be energized. The reference voltage may be changed to vary the lead angle and hence the speed of the step motor. The field winding of a particular phase may be any one of field windings, for example, an unenergized phase as in U.S. Pat. Nos. 4,282,471 or 4,480,218 or a last energized field winding as in a preferred embodiment of the invention described below.

In the preferred embodiment described below, a step motor will be described as to be driven in the four phase two on excitation. Thus, the EMF is effectively detected at a last one of two energized field windings.

Since the EMF cannot be detected directly from a last energized field winding but is involved as latent information in an electric current flowing through the field winding, such a current is first detected. This current, however, further involves, as latent information, a component which may be induced by a back EMF induced in the field winding by a self inductance of the winding. In other words, in order to detect the EMF induced in the last energized field winding by the permanent magnet of the rotor of the step motor, an electric current caused to flow through the field winding by the self inductance must be cancelled to detect a component of an actual current of the field winding which results from the EMF caused by the rotor magnet.

Figure 2A:
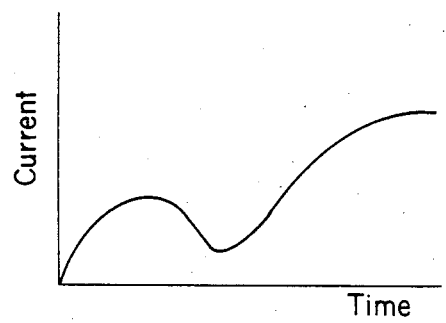
FIG. 2A is a graphic diagram of a waveform of a current flowing through a winding of the motor of FIG. 1 during rotation.
Figure 2B:
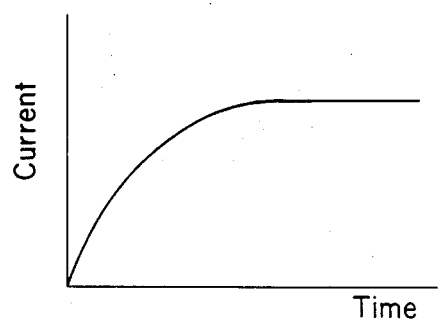
FIG. 2B is a similar view but in a blocked condition of the motor.

FIG. 2A shows a typical waveform of an electric current flowing through a field winding of a four phase step motor when a predetermined voltage is applied to the field winding during rotation of the motor. Meanwhile, FIG. 2B shows a waveform of an electric current flowing through the same field winding while the rotor of the motor is held from rotation. The waveform of FIG. 2B is a curve of an exponential function which is determined in accordance with the inductance to resistance ratio L/R time constant of the winding. Thus, an electric current caused to flow through the field winding due to an EMF induced by the rotor magnet of the motor is obtained from the waveform of FIG. 2A subtracted from the waveform of FIG. 2B. An analog comparator will allow such subtraction.

Figure 2C:
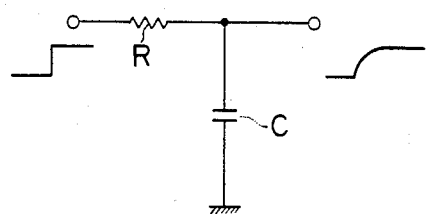
FIG. 2C is a diagram showing a circuit having a same time constant with the winding of the motor of FIG. 1A.

However, while the waveform of FIG. 2A can be obtained from a step motor during operation, the waveform of FIG. 2B cannot be obtained directly from any portion of the motor. Therefore, an equivalent R/C circuit as shown in FIG. 2C is used. The circuit of FIG. 2C includes a resistor R and a capacitor C which present the same time constant as the field winding and thus provides an output voltage presenting a same waveform as that of FIG. 2B, as seen from the waveform of FIG. 2C. Accordingly, if the currents indicated by the waveforms in FIGS. 2A and 2B are suitably detected as voltage signals, an electric current caused to flow through a last energized field winding by an EMF induced by the rotor magnet can be actually obtained as a voltage signal by comparison of a voltage signal indicating an electric current of the field winding with a voltage signal produced at such an R/C circuit.

Figure 2D:
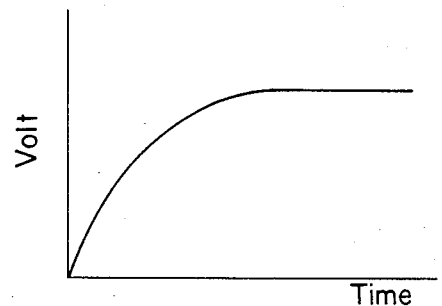
FIG. 2D is a graphic diagram of a waveform of a voltage appearing at an output of the circuit of FIG. 2C.
Figure 2E:
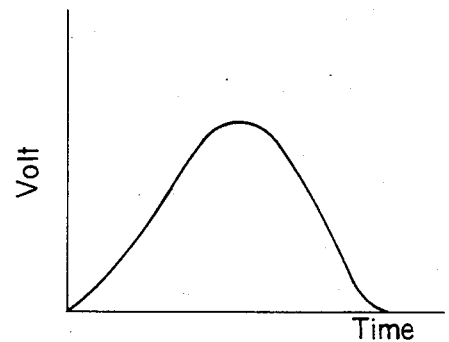
FIG. 2E is a graphic diagram of a waveform of EMF induced in a winding of the motor of FIG. 1A.

FIG. 2E shows a typical inverted waveform of the voltage signal obtained by such comparison. The waveform may ideally be part of a sinusoidal curve as seen in FIG. 1B but may actually be deformed by some other factors such as an ununiform magnetic field of the motor. Anyway, if the waveform presents a continuous curve based on a sinusoidal curve and successively indicating the position of the rotor of the motor, it can be used to produce therefrom an energization starting instruction for starting energization of a next field winding in accordance with the present invention.

Now, a step motor control system according to a preferred embodiment of the present invention will be described with reference to a circuit diagram of FIG. 3. It is to be mentioned here that the step motor control system is designed, in the embodiment, to receive required signals from a main or master controller of a daisy wheel type electronic typewriter and control a step motor for selecting a character type on a daisy wheel type wheel of the typewriter as described hereinabove.

The step motor to which the step motor control system shown is applied is constituted as a four phase step motor which is driven in the four phase two on excitation as described below, and the step motor includes a rotor and field windings $\phi 1$ to $\phi 4$ of four phases indicated as phase 1 to phase 4, respectively. The field windings $\phi 1$ to $\phi 4$ are connected at respective one ends thereof to a voltage supply Vm and at the other ends thereof to the collectors of driver transistors Tr1 to Tr4, respectively. Current detecting resistors R1 to R4 for detecting electric currents flowing through the phase 1 to phase 4 windings are connected at respective one ends thereof to the emitters of the driver transistors Tr1 to Tr4, respectively, and the resistors R1 to R4 are grounded at the other ends thereof. The resistors R1 to R4 each have a sufficiently low resistance compared with the resistance of each winding $\phi 1$ to $\phi 4$ so as not to affect an electric current flowing through the field winding $\phi 1$ to $\phi 4$.

Operational amplifiers OP1 to OP4 are connected at noninverting input terminals thereof to junctions between the transistors Tr1 to Tr4 and the resistors R1 to R4 by way of offset adjusting resistors R9 to R12, respectively. The noninverting input terminals of the operational amplifiers OP1 to OP4 are also grounded via offset adjusting resistors R13 to R16 and further offset adjusting resistors R17 to R20 which are connected at center taps thereof to the resistors R13 to R16 with one ends open and with the other ends grounded, respectively. The resistors R13 to R20 are connected to adjust the offsets delivered to the outputs (a) to (d) of the operational amplifiers OP1 to OP4, respectively, and can be omitted where the output offsets are low. Inverting input terminals of the operational amplifiers OP1 to OP4 are grounded via resistors R5 to R8, respectively, and output terminals of the operational amplifiers OP1 to OP4 are connected to the inverting input terminals of the operational amplifiers OP1 to OP4 via adjusting feedback resistors Rf1 to Rf4, respectively. Where fine adjustment is not required, or for simplified circuit construction, the resistors R13 to R20 and Rf1 to Rf4 can be omitted.

The outputs of the noninverting amplifiers OP1 to OP4 are also connected to an analog data selector SL which selectively outputs a voltage of one of the operational amplifiers OP1 to OP4 in response to select signals supplied to select signal input terminals A, B, and C of the analog data selector SL, respectively. Output terminal of the data selector SL is connected to an inverting input terminal of a differential amplifier OP5 via a resistor R22.

Connected to a noninverting input terminal of the operational amplifier OP5 is a simulating circuit for simulating a signal induced in a last energized field winding $\phi 1$ to $\phi 4$ due to self inductance of the last energized field winding $\phi 1$ to $\phi 4$. The signal produced by the simulating circuit is a simulation waveform of the type previously described and shown in FIG. 2D. The simulating circuit may include an integrating circuit including a variable resistor R having one end connected to the voltage supply Vm, and a capacitor C having one end connected to the other end of the resistor R and the other end grounded. The junction between the resistor R and the capacitor C is connected to the collector of a transistor Tr5 the emitter of which is grounded. The base of the transistor Tr5 is connected to an output terminal P4 of a controller in the form of a one-chip microcomputer MC so that it may be turned on by a trigger signal supplied from the microcomputer MC to cause an electric charge to be discharged from the capacitor C of the integrating circuit. The collector of the transistor Tr5 is also connected to one end of a voltage divider R0 which is grounded at the other end thereof. A center tap of the voltage divider R0 is connected to a noninverting input terminal of the operational amplifier OP5 via a resistor R23 which constitutes a fixed voltage divider together with another resistor R24 which is grounded at the other end thereof.

The resistor R and the capacitor C of the integrating circuit are selected or adjusted such that they may present a time constant equal to an inductance to resistance ratio L/R time constant of a last energized field winding. However, since the field windings $\phi 1$ to $\phi 4$ normally have somewhat different resistances and inductances and hence somewhat different inductance to resistance ratio L/R time constants, the integrating circuit and hence the simulating circuit may preferably be constituted to have an average time constant among the L/R time constants in order to minimize the error in a position signal induced in a last energized field winding by the permanent magnet of the rotor of the motor. The variable resistor R assures such an average time constant of the integrating circuit. However, where the difference among the L/R time constants of the field windings cannot be ignored, the simulating circuit may include a plurality of such integrating circuits which present time constants substantially same as time constants of the respective field windings of the motor.

Output terminal of the differential amplifiers OP5 is connected to the inverting input terminal of the amplifier OP5 via a feedback resistor R25 and also to an inverting input terminal of a comparator OP6 which has an output terminal connected to a voltage supply Vc via a pull-up resistor R26 and also to an input terminal P9 of the microcomputer MC. Coupled to a non-inverting input terminal of the differential amplifier OP6 is an output of a digital to analog converter DAC having input terminals C1 to C4 connected to output terminals P5 to P8 of the microcomputer MC.

Figure 3:
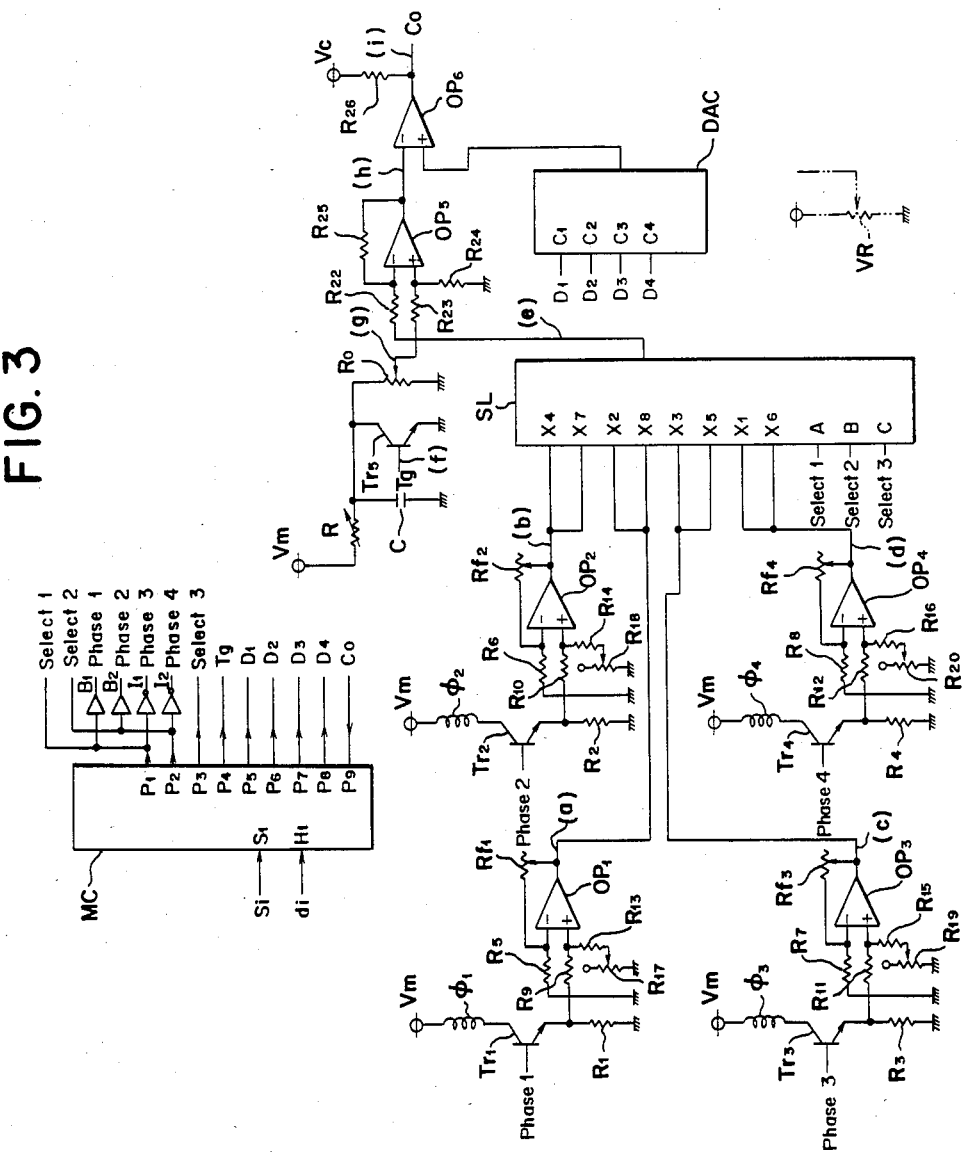
FIG. 3 is a circuit diagram schematically showing a step motor control system according to the present invention.

The one-chip microcomputer MC includes, as in a conventional microcomputer, a central processing unit (CPU), a read-only memory (ROM) having a control program stored therein, and a random access memory (RAM) while not shown in FIG. 3. The microcomputer MC has several input/output (I/O) ports or terminals including, in addition to the output ports P4 to P8 and the input port P9 mentioned hereinabove, an input terminal S1 at which it receives a step count instruction or signal Si indicating the number of steps to rotate, another input terminal Hi at which it receives a rotational direction instruction signal di indicating a direction for the step motor to rotate, and three further output terminals P1 to P3 for outputting an instruction to drive the step motor. It will be appreciated that the signals Si and di are received from the main controller of the typewriter as described above.

Thus, the microcomputer MC provides, in response to signals supplied to the input ports S1, H1 and P9 and in accordance with the program stored in the ROM, output signals from the output ports P1 to P8 thereof. Such output signals include phase selection data Select1 to Select3 which are provided from the terminals P1 to P3 to input terminals A, B and C of the analog data selector SL, respectively, a trigger signal Tg which is provided from the terminal P4 to the base of the transistor Tr5, and threshold data D1 to D4 which are provided from the terminals P5 to P8 to the D/A converter DAC.

A buffer B1 or B2 and an inverter I1 or I2 are connected to each of the output ports P1 and P2 of the microcomputer MC. The buffers B1 and B2 and the inverters I1 and I2 thus receive phase selection data Select1 and Select2 and provide phase excitation data Phase1 to Phase4 for instructing selective energization of the field windings of corresponding phases.

Now, operation of the step motor control system of FIG. 3 in accordance with the stored program in the ROM of the microcomputer MC will be described.

After power has been made available, the controller MC initializes the entire system at step 100. In this instance, the microcomputer MC outputs from the output terminals P1 and P2 an instruction to energize, for example, field windings $\phi 1$ and $\phi 4$, as seen from the waveforms (a) to (d) of FIG. 4, to position the rotor of the motor to an initial position. Thus, high level voltage signals are applied to the bases of the driver transistors Tr1 and Tr4 for the field windings $\phi 1$ and $\phi 4$, respectively.

Then, the controller MC waits for reception of a step count signal Si and a rotational direction signal di. Upon reception of such signals Si and di from the main controller of the typewriter, the signals Si and di are stored in a step count register and a rotational direction register, respectively, in a RAM area of the microcomputer MC at steps 101 and 102. Then, the microcomputer MC outputs a trigger pulse or signal Tg as seen at a waveform (f) of FIG. 4 to turn the transistor Tr5 on, which instantaneously discharges the electric charge loaded in the capacitor C of the integrating circuit, and thereafter an operation to charge the capacitor is started at the same time when the transistor Tr5 is turned off which occurs just after disappearing of the trigger pulse Tg. The charging voltage is applied to an end of the differential amplifier OP5 via the variable resistor R0 and the resistor R23.

Then, phase excitation signals Phase1 to Phase4 and phase selection signals Select1 to Select3 are developed in response to the signals Si and di from the terminal P1 to P3 (step 103). Of the signals Select1 to Select3, the signal Select3 actually indicates a direction in which the motor is to rotate, and thus if the motor is to rotate clockwise, a low level voltage is delivered to the terminal P3, but on the contrary if the motor is to rotate counterclockwise, a high level voltage is applied to the terminal P3. The phase selection signals Select1 to Select3 are delivered to the analog data selector SL so that one of the analog signals (a) to (d) received at the other input terminals X1 to X8 from the operational amplifiers OP1 to OP4 may be selectively delivered from the output terminal of the data selector SL. The analog data selector SL may be any of analog data selectors on the market, and for example, an IC chip MC14051B from Motorola.

Figure 4:
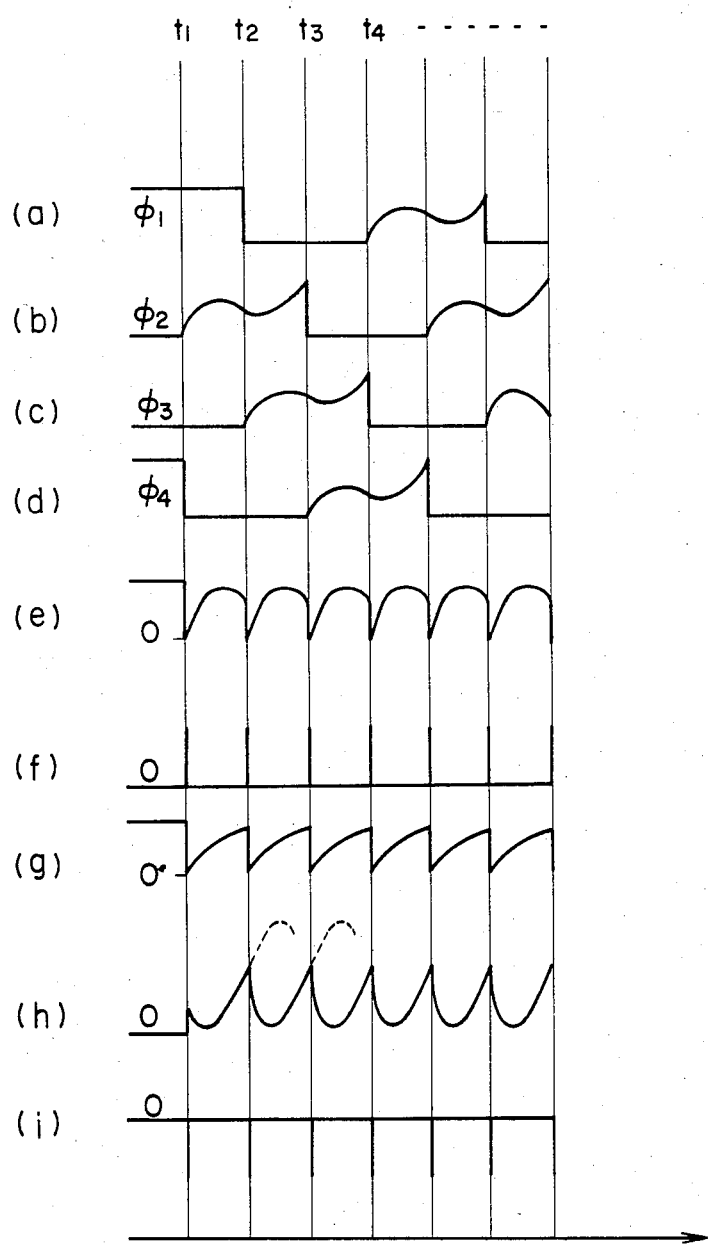
FIG. 4 is a graphic diagram of waveforms at several portions of the circuit of FIG. 3.
Figure 5:
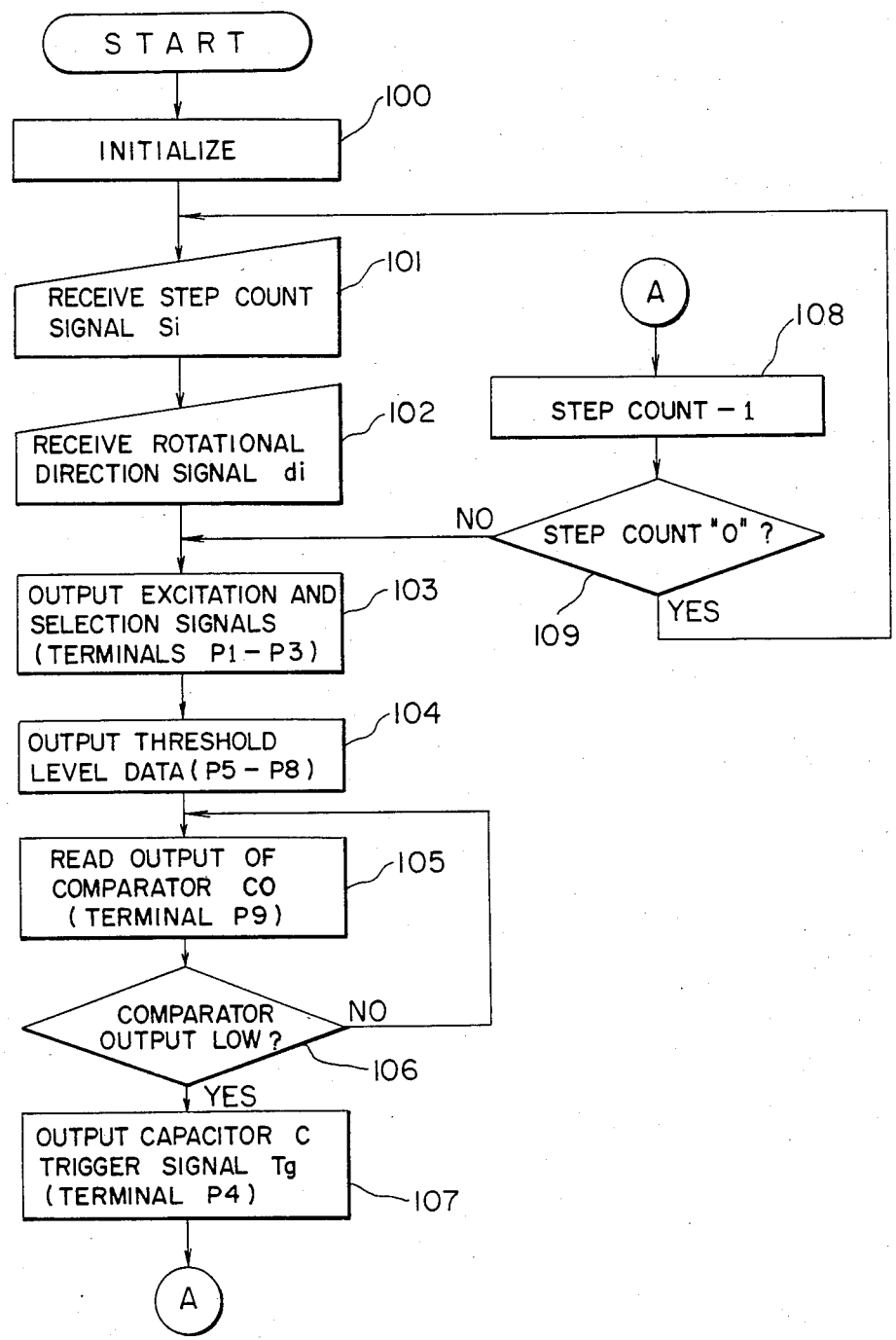
FIG. 5 is a flowchart illustrating operations of the step motor control system of FIG. 3.

Meanwhile, the phase selection signals Phase1 to Phase4 are applied to the bases of the driver transistors Tr1 to Tr4, respectively. Consequently, the field winding $\phi 2$ is now energized and the field winding $\phi 4$ is deenergized at a point of time t1 as seen in FIG. 4. As a result, the rotor of the stepping motor starts its rotation for one step in a forward or clockwise direction.

Points of time at which the field windings $\phi 1$ to $\phi 4$ are selectively energized and deenergized successively are denoted t1 to t4 in FIG. 4 and also in Tables 1 and 2 below. Table 1 indicate signals appearing at the output terminals P1 to P3 of the microcomputer MC and applied to the field windings $\phi 1$ to $\phi 4$ at such points of time t1 to t4 when the step motor is to be rotated forwardly or in the clockwise direction, and Table 2 indicate those when the motor is to be rotated reversely or in the counterclockwise direction, and wherein "1" denotes a high level or energization of a field winding and "0" denotes a low level or deenergization of a field winding.

TABLE 1

States for Forward Rotation

| | time | | | |
|---|---|---|---|---|
| | t1 | t2 | t3 | t4 |
| P1 | 1 | 0 | 0 | 1 |
| P2 | 1 | 1 | 0 | 0 |
| P3 | 0 | 0 | 0 | 0 |
| $\phi 1$ | 1 | 0 | 0 | 1 |
| $\phi 2$ | 1 | 1 | 0 | 0 |
| $\phi 3$ | 0 | 1 | 1 | 0 |
| $\phi 4$ | 0 | 0 | 1 | 1 |

TABLE 2

States for Reverse Rotation

| | time | | | |
|---|---|---|---|---|
| | t1 | t2 | t3 | t4 |
| P1 | 0 | 0 | 1 | 1 |
| P2 | 0 | 1 | 1 | 0 |
| P3 | 1 | 1 | 1 | 1 |
| $\phi 1$ | 0 | 0 | 1 | 1 |
| $\phi 2$ | 0 | 1 | 1 | 0 |
| $\phi 3$ | 1 | 1 | 0 | 0 |
| $\phi 4$ | 1 | 0 | 0 | 1 |

The periods of time (t2–t1), (t3–t2), (t4–t3), (t1–t4), etc. are determined by threshold data to be described later. In response to outputs from the terminals P1 to P3, the analog data selector SL selectively outputs a voltage signal from the operational amplifier OP1, OP2, OP3 or OP4 as shown in Table 3.

TABLE 3

| | Select | | Data Selection | |
|---|---|---|---|---|
| C (P3) | B (P2) | A (P1) | Terminal Selected | Motor Phase |
| 0 | 0 | 0 | X1 | φ4 (OP4) |
| 0 | 0 | 1 | X2 | φ1 (OP1) |
| 0 | 1 | 0 | X3 | φ3 (OP3) |
| 0 | 1 | 1 | X4 | φ2 (OP2) |
| 1 | 0 | 0 | X5 | φ3 (OP3) |
| 1 | 0 | 1 | X6 | φ4 (OP4) |
| 1 | 1 | 0 | X7 | φ2 (OP2) |
| 1 | 1 | 1 | X8 | φ1 (OP1) |

In Table 3, the upper section shows states in a case of clockwise rotation, while the lower section shows those in a case of the counterclockwise rotation, wherein output of the operational amplifier OP1, OP2, OP3, or OP4 selected respresents one of the field windings which is selected for energization in response to the phase excitation signals Phase1 to Phase 4.

The energization states of the phase field windings φ1 to φ4 at step 103 are indicated by waveforms (a) to (d) of FIG. 4, respectively. The output of the analog data selector SL selected in the step 103 is illustrated by another waveform (e) of FIG. 4.

Thus, when the motor is to be rotated forwardly from the position just after initialization of the system in which the microcomputer MC provides a low level signal from its output P1 and a high level signal from its terminals P2 and P3 to select the field windings φ1 and φ4 for energization, now the terminal P2 is set to the high level while the other terminals P1 and P3 are maintained at step 103 in order that energization of the field winding φ2 and deenergization of the field winding φ4 may be started. In response to the high level signal at the terminal P2, the buffer B2 now provides a high level signal as Phase2 which is coupled to turn on the driver transistor Tr2 for the field winding φ2 while the inverter I2 provides a low level signal as Phase4 which is coupled to turn off the driver transistor Tr4 for the field winding φ4. Consequently, the field winding φ2 is now energized and the field winding φ4 is deenergized. As a result of such energization of the field winding φ2, a voltage appears across the voltage detecting resistor R2 due to a current flowing through the field winding φ2. This voltage is amplified by the operational amplifier OP2 and delivered to the analog data selector SL. Since the phase selection signals received from the select terminals P1, P2 or P3 of the microcomputer MC instruct selection of the second phase φ2 (refer to Table 3), the analog data selector SL outputs the voltage supplied from the operational amplifier OP2.

Since the output of the analog data selector SL is applied to the other input of the differential amplifier OP5, a voltage signal corresponding to a difference in voltage between the output (g) of the variable resistor R0 and the analog voltage signal (e) supplied from the analog data selector SL appears at the output terminal of the differential amplifier OP5. This output voltage (h) is shown at (h) of FIG. 3, and it will be appreciated that the voltage signal (h) continuously represents a current position of the rotor relative to the last energized field winding.

Subsequently at step 104, threshold level data is delivered from the terminals P5 to P8 of the microcomputer MC. The output is changed into a voltage signal by the digital to analog converter DAC, and the resultant voltage is applied to the comparator OP6 and compared with a reference voltage or threshold level which is provided from the output of the digital to analog converter DAC. The output Co of the comparator OP6 is coupled to the microcomputer Mc at step 105 and determined thereby at step 106 whether it is at a low level or not.

It is to be noted that the waveform (h) of FIG. 4 always presents a higher voltage than 0 volt while an EMF induced in any field winding by the permanent magnet of the rotor varies between positive and negative maximum voltages as seen in the waveforms of FIGS. 1B and 1C. This is because the EMF is detected as a volt signal appearing across the current detecting resistor R1 to R4 and is thus shifted in voltage toward the positive. Accordingly, the output voltage of the simulating circuit is adjusted by the voltage divider Ro in order to allow comparison with such a shifted voltage signal.

While the simulated voltage signal (h) is lower than the reference voltage provided by the D/A converter DAC, the comparator OP6 outputs a high level signal, but during rotation of the step motor for one step, the simulated voltage signal (h) will become equal to or higher than the reference voltage, and at such a point of time, the comparator OP6 develops a negative pulse as seen in the waveform (i) of FIG. 4. The negative pulse signal indicates that the rotor is at a predetermined angular position, that is, at a position of a predetermined lead angle at which subsequent energization and deenergization of the field windings are to be started.

The negative pulse C0 coupled from the comparator OP6 is judged at step 106 by the microcomputer MC, and the microcomputer OP6 outputs, now at the timing t2 at step 107, a trigger signal Tg from the output P3 which causes the integrating circuit of the simulating circuit to provide an exponentially varying waveform again.

Then at step 108, the value in the step count register in the RAM is decremented by one, and the obtained value is checked against "0" at step 109. In case the value of the step count register is found to be "0", this means the stepping motor has been driven by the steps defined by the step count input at step 100, and thus the process returns to step 101 in order to wait for subsequent reception of instructions for a subsequent rotation of the motor from the main controller of the machine. On the contrary if the step count value is other than "0" at step 109, the series of operations beginning with step 103 and ending with step 109 will be repeated until the step count value, that is, the value in the step count register, becomes "0".

During such stepping operations until the predetermined position of the rotor as initially instructed by the main controller of the machine is reached, the angle of lead of the rotor may be changed by changing the threshold level, namely, the output level of the digital to analog converter DAC to assure appropriate starting and stopping of the motor. For example, upon starting of the motor, the threshold level may be gradually lowered for the first, for example, 3 steps to effect slow-up starting, and to the contrary upon stopping of the motor, the threshold level may be gradually raised for the last, for example, 3 steps. Naturally, the velocity can be controlled by adjusting the threshold level, that is, in response to threshold data provided by the controller MC.

Such a threshold level voltage may alternatively provided by a potentiometer VR (indicated by two dots and dash lines in FIG. 3) by which the power supply voltage is divided. In this case, the voltage division ratio of the power supply voltage may be manually set to the potentiometer or the position of the slider of the potentiometer may be set in response to an output of the microcomputer MC.

What is claimed is:

1. A control system for controlling a stepping motor of the type including a rotor and a plurality of electromagnetic field winding adapted to be separately energized to control rotation of said rotor, comprising:
   means for generating a signal representative of the back electromotive force induced by said rotor in an energized one of said field windings;
   means for generating a reference signal corresponding to a desired angle of lead in driving said rotor of said motor;
   means for detecting coincidence of said signal representative of the back electromotive force with said reference signal; and
   driving means operable upon detection of the coincidence between said signal representative of the back electromotive force and said reference signal for starting selective energization and deenergization of said field windings for a subsequent stepping motion of said motor.

2. A control system according to claim 1, wherein the lead angle can be adjusted by changing said reference signal to control the rotational speed of said motor.

3. A control system for controlling a stepping motor of the type including a rotor and a plurality of electromagnetic field winding adapted to be separately energized to control rotation of said rotor, comprising:
   means for generating a signal representative of the back electromotive force induced by said rotor in an energized one of said field windings by subtracting a detected waveform representing the current induced in said field winding from a simulation waveform representing the current induced in said field winding due to its self inductance;
   means for providing a reference voltage corresponding to a desired angle of lead in driving said rotor of said motor;
   means for comparing said signal representative of the back electromotive force with said reference voltage;
   control means operable in response to detection of coincidence between said signal representative of the back electromotive force and said reference voltage for developing an instruction to start selective energization and deenergization of said field windings for a subsequent stepping motion of said motor; and
   means for driving said motor in response to the instruction from said control means.

4. A control system according to claim 3, wherein said means for generating said signal representative of the back electromotive includes a resistor of low resistance connected in series to each of said field windings for providing a voltage signal corresponding to an electric current flowing through the corresponding field winding.

5. A control system according to claim 4, wherein said means for generating said signal representative of the back electromotive force further includes an analog data selector connected to receive voltage signals from the resistors connected to said field windings for delivering therefrom the voltage signal corresponding to said energized one of said field windings.

6. A control system according to claim 3, wherein the reference voltage provided by said reference voltage providing means is adjustable to control the rotational speed of said motor.

7. A control system according to claim 3, wherein said reference voltage providing means is a digital to analog converter.

8. A control system according to claim 3, wherein said means for generating said signal representative of the back electromotive force includes simulation means for simulating a signal induced in said energized one of said field windings due to self inductance of said field winding.

9. A control system according to claim 8, wherein said simulation means is an integrating circuit having a same time constant with said last energized field winding and including a resistor and a capacitor.

10. A process of controlling a stepping motion of a stepping motor of the type including a rotor and a plurality of electromagnetic field windings adapted to be separately energized to control rotation of said rotor, comprising:
    generating a signal representative of the back electromotive force induced by said rotor in an energized one of said field windings by subtracting a detected waveform representing the current induced in said field winding from a simulation waveform representing the current induced in said field winding due to its self inductance;
    generating a reference voltage corresponding to a desired angle of lead in driving said rotor of said motor;
    comparing said signal representative of the back electromotive force with said reference voltage; and
    starting selective energization and deenergization of said field windings for a subsequent stepping motion of said motor when coincidence between said signal representative of the back electromotive force and said reference voltage is detected.

11. A control system for controlling a stepping motor of the type including a rotor having a permanent magnet and a plurality of electromagnetic field windings adapted to be separately energized to control rotation of said rotor, comprising:
    means for continuously detecting an electric current flowing through a last energized one of said field windings and for developing a voltage signal representing the electric current;
    simulation means for simulating a signal induced in said last energized field winding due to self inductance of said last energized field winding;
    means for successively comparing said signal induced in said last energized field winding with said voltage signal to produce a position signal induced in said last energized field winding by said permanent magnet pole of said rotor and indicating a current position of said rotor relative to said last energized field winding;
    means for providing a reference voltage corresponding to a desired angle of lead in driving said rotor of said motor;
    means for detecting coincidence of said position signal and said reference voltage; and
    control means operable in response to detection of coincidence between said position signal and said reference voltage for controlling selective energization and deenergization of said field windings of said motor.

12. A control system according to claim 11, wherein said detecting means includes a resistor of a low resistance connected in series to each of said field windings of said motor for providing a voltage signal corresponding to an electric current flowing through the corresponding field winding.

13. A control system according to claim 12, wherein said detecting means further includes an analog data selector connected to receive voltage signals from the resistors connected to said field windings for delivering therefrom the voltage signal corresponding to the last energized one of said field windings.

14. A control system according to claim 11, wherein said simulation means has the same time constant as the last energized one of said field windings.

15. A control system according to claim 11, wherein said simulation means includes an integrating circuit which includes a capacitor and a resistor.

16. A control system according to claim 15, wherein said simulation means further includes means for triggering said integrating circuit to cause the discharge of said capacitor.

17. A control system according to claim 16, wherein said triggering means is a transistor.

18. A control system according to claim 16, wherein said resistor of said integrating circuit is a variable resistor.

19. A control system according to claim 3, wherein said means for generating said signal representative of the back electromotive force includes:
   means for continuously detecting an electric current flowing through said last energized field winding and for developing a voltage signal representing the electric current;
   means for generating a simulation waveform representing the current induced in said last energized field winding due to self inductance of said last energized field winding; and
   means for subtracting said voltage signal from asid simulation waveform to develop said signal representative of the back electromotive force induced only by the rotation of said rotor.

20. A process according to claim 10, wherein the step of generating said signal representative of the back electromotive force comprises:
   continuously detecting an electric current flowing through said last energized field winding and for developing a voltage signal representing the electric current;
   generating a simulation waveform representing the current induced in said last energized field winding due to self inductance in said last energized field winding; and
   subtracting said voltage signal from said simulation waveform to develop said signal representative of the back electromotive force induced only by the rotation of said rotor.

* * * * *

UNITED STATES PATENT AND TRADEMARK OFFICE
CERTIFICATE OF CORRECTION

PATENT NO. : 4,734,631

DATED : March 29, 1988

INVENTOR(S) : SHIGEO et al

It is certified that error appears in the above-identified patent and that said Letters Patent is hereby corrected as shown below:

Col. 1, line 21, delete "of", first occurrence.

Col. 4, line 6, "-VT" should read -- -Vt --.

Claim 3, line 3, "winding" should read --windings--.

Claim 19, line 12 "asid" should read --said--.

Signed and Sealed this

Ninth Day of August, 1988

Attest:

DONALD J. QUIGG

Attesting Officer

Commissioner of Patents and Trademarks